US008419902B2

(12) United States Patent
Feerer et al.

(10) Patent No.: US 8,419,902 B2
(45) Date of Patent: Apr. 16, 2013

(54) METHOD AND SYSTEM FOR WASTELESS PROCESSING AND COMPLETE UTILIZATION OF MUNICIPAL AND DOMESTIC WASTES

(75) Inventors: Arkady Feerer, San Francisco, CA (US); Marat Hasbulatovich Kulakov, Moscow (RU); Denis Zagorsky, Moscow (RU)

(73) Assignee: Greenlight Energy Solutions, LLC, San Francisco, CA (US)

( * ) Notice: Subject to any disclaimer, the term of this patent is extended or adjusted under 35 U.S.C. 154(b) by 609 days.

(21) Appl. No.: 12/454,502

(22) Filed: May 19, 2009

(65) Prior Publication Data

US 2010/0293853 A1 Nov. 25, 2010

(51) Int. Cl.
*C10B 1/00* (2006.01)
*C10B 7/10* (2006.01)

(52) U.S. Cl.
USPC .................. 202/96; 48/111; 48/119; 48/128; 202/118; 202/262

(58) Field of Classification Search .................... 202/96, 202/118, 262; 201/8, 16, 32; 48/111, 119, 48/128; 110/257
See application file for complete search history.

(56) References Cited

U.S. PATENT DOCUMENTS

| | | | | |
|---|---|---|---|---|
| 1,044,531 | A * | 11/1912 | Hunter | 423/437.1 |
| 3,862,887 | A * | 1/1975 | Bielski et al. | 201/2.5 |
| 4,152,122 | A * | 5/1979 | Feldmann | 48/111 |
| 5,290,327 | A * | 3/1994 | Rossle | 48/111 |
| 5,302,254 | A * | 4/1994 | Martin et al. | 201/21 |
| 5,544,597 | A | 8/1996 | Camacho | |
| 6,178,899 | B1 | 1/2001 | Kaneko et al. | |
| 6,619,214 | B2 * | 9/2003 | Walker | 110/229 |
| 7,000,551 | B2 | 2/2006 | Cole et al. | |
| 7,044,069 | B2 | 5/2006 | Cole et al. | |
| 7,394,041 | B2 | 7/2008 | Choi | |
| 7,416,641 | B2 * | 8/2008 | Denison | 202/99 |
| 2006/0076224 | A1 * | 4/2006 | Ku | 202/99 |
| 2007/0113761 | A1 | 5/2007 | Cole et al. | |
| 2007/0186829 | A1 | 8/2007 | Cole et al. | |
| 2007/0289507 | A1 | 12/2007 | Parrot et al. | |
| 2008/0149471 | A1 * | 6/2008 | Wolfe | 202/118 |
| 2008/0236042 | A1 | 10/2008 | Summerlin | |
| 2009/0020052 | A1 | 1/2009 | Becchetti et al. | |

OTHER PUBLICATIONS

Centri-Sifter Centrifugal Screeners, www.kason.com/centrifugal/index.php, accessed May 15, 2012, 1 page.*

* cited by examiner

*Primary Examiner* — Jill Warden
*Assistant Examiner* — Joye L Woodard
(74) *Attorney, Agent, or Firm* — TransPacific Law Group; Pavel Pogodin, Esq.

(57) ABSTRACT

Proposed are a system and method for wasteless pyrolytic processing and complete utilization of municipal and domestic wastes. The wastes are sequentially passed through units of sorting, grinding, drying, accumulating, and sending to a pyrolysis reactor for pyrolytic treatment. The syngas produced in the pyrolysis is passed through dry cleaning, dust catching, a first wet cleaning with water, a second wet cleaning with alkali, and a floatation unit for separation of water which is purified to an extent sufficient for technical use. The purified syngas is also passed through an absorber and is then used as a working medium for a power generation unit such as a gas turbine co-generator that generates electricity. Solid products of the pyrolysis reaction, such as coke, are returned to the reactor for afterburning, and the heat of the reaction can be utilized in a dryer, or the like.

8 Claims, 6 Drawing Sheets

METHOD AND SYSTEM FOR WASTELESS PROCESSING AND COMPLETE UTILIZATION OF MUNICIPAL AND DOMESTIC WASTES

FIELD OF THE INVENTION

The present invention relates to treatment of wastes, and more particularly, to a method and system for wasteless processing and complete utilization of solid municipal and domestic wastes by pyrolytic treatment.

BACKGROUND OF THE INVENTION

The disposal of municipal, industrial, agricultural and other types of wastes is a problem that continues to grow with the increase of population and with growth of production, especially in the industrially developed countries.

The USA generates 11 billion tons (10 billion metric tons) of solid wastes each year. Solid wastes are waste materials that contain less than 70% water. This class includes such materials as household garbage, some industrial wastes, some mining wastes, and oilfield wastes such as drill cuttings. Liquid wastes are usually wastewaters that contain less than 1% solids. Such wastes may contain high concentrations of dissolved salts and metals. Sludge is a class of wastes between liquid and solid. It usually contains between 3% and 25% solids, while the rest of the material is water-dissolved materials.

Federal regulations classify wastes into three different categories, such as non-hazardous wastes (e.g., a household garbage), common hazardous wastes (such as those having ignitability or reactivity) and special hazardous wastes (e.g., radioactive and medical).

There are many different methods of disposing of wastes of which most common is disposing to landfills. In a modern landfill, refuse is spread thin, and the compacted layers are covered by a layer of clean earth.

Another method of wastes disposal is incineration. The myth that burning makes wastes disappear has lead to incineration emerging as a widely used method for disposing many kinds of wastes, including hazardous wastes. However, along with elimination of the wastes, incinerators generate very toxic gases. Moreover, incinerator ashes are contaminated with heavy metals, unburned chemicals, and new chemicals formed during the burning process. These ashes are then buried in landfills or dumped in the environment. In other words, incineration is a method where industry can break down its bulk wastes and disperse it into the environment through air, water, and ash emissions. Thus, the industry masks today's waste problems and passes them onto future generations.

Existing data shows that burning hazardous wastes, even in "state-of-the-art" incinerators, produces heavy metals, unburned toxic chemicals, and generates new pollutants— entirely new chemicals formed during the incineration process.

An alternative method of waste disposal is pyrolysis of the wastes. Pyrolysis is the chemical decomposition of materials by heating in the absence of oxygen. Many different methods and apparatus are known in the art for pyrolytic processing of wastes.

For example, U.S. Pat. No. 4,308,807 issued in 1982 to S. Stokes discloses an apparatus for pyrolytically treating municipal and other wastes composed of solid heat-decomposable materials by radioactive heating from an open flame and convective heating. The invention is aimed at a recovery of a part of an initial energy input. The source of initial heat energy input can vary from gasification of renewable fuel such as wood chips and the like, to burning of a primary fuel but preferably augmented by burning of at least a portion of the gaseous pyrolytic decomposition gases produced as a result of treatment of the wastes. The apparatus is capable of handling the wastes both prior to and after the pyrolysis process. The pyrolysis temperature is relatively low and ranges from 250° C. to 600° C. The untreated wastes are dried directly in the pyrolysis reactor. By-products contain liquid fuel, e.g., oil. Although the heat generated by the apparatus is reused in the waste-processing system, the apparatus does not generate thermal energy as its final product. Another disadvantage is that gas produced in the process is discharged into the atmosphere without preliminary cleaning.

U.S. Pat. No. 5,678,496 issued in 1997 to D. Buizza, et al. describes a method and a plant for pyrolytic treatment of wastes that contain organic materials, particularly municipal solid wastes. The method comprises loading the wastes onto transport trolleys, inserting the trolleys with the waste into a treatment tunnel that has a pyrolysis chamber, carrying out pyrolysis of the wastes by indirectly heating the wastes to a temperature of 500° C. to 600° C., discharging the gaseous-phase substances generated by the pyrolysis from the chamber, and removing the trolleys from the tunnel for unloading the solid residues remained in the trolleys. The gas obtained as a result of pyrolysis is subjected to pre-cleaning by bicarbonate treatment that involves the use of nucleating and/or adsorbent agents, such as sodium bicarbonate or activated charcoal fines. The pre-cleaned gas is dissipated into the atmosphere, while the carbon residue of pyrolysis is utilized.

U.S. Pat. No. 5,868,085 issued in 1999 to A. Hansen, et al. discloses a system for pyrolysis of hydrocarbon constituents of waste material. The system includes a treatment unit featuring a retort with an ellipsoidal cross-section forming a first retort half and a second retort half. The material to be treated is selectively deposited in only one half of the retort at a time during any given period of system operation This is done to avoid abrasion and wear of the half not in use, thus prolonging the life of the retort component. For improving efficiency of the system, gases that formed in the pyrolysis are retuned directly into the interior of the retort. Prior to discharge into the atmosphere, the gaseous products of pyrolysis are cleaned from pollutants by using a plurality of selectively detachable gas injection tubes, which provide fuel for thermal oxidation of the gases. Each injection tube can be removed for cleaning independently of any other injection tube, and removal can be accomplished without disrupting operation of the system. The system is provided with a dryer that uses solar energy, which significantly limits the areas where the system can be used.

U.S. Pat. No. 6,178,899 issued in 2001 to M. Kaneko, et al. describes an installation for pyrolytic treatment of industrial and household wastes for carbonizing waste-containing organic substances in a condition sealed from an air so as to separate the wastes into a pyrolysis gas and a pyrolysis residue. The pyrolysis process is carried out at a high temperature in the rage of 1000° C. to 1200° C. In a gas cracking step of the process, pyrolysis gas is reacted with an oxide component for thermally decomposing high molecular hydrocarbon in the pyrolysis gas. The heat generated by the oxidization reaction produces a cracked gas that contains low molecular hydrocarbon. The product then passes through a residue cooling step for cooling and solidification of the pyrolysis residue. The obtained solid residue is mechanically crushed and sorted for obtaining a pyrolysis char consisting essentially of a pyrolyzed organic substance and inorganic components.

The obtained pyrolysis char is burned at a high temperature by being mixed with fuel and oxygen or air for melting and gasification of the carbon component to obtain a gasified gas that contains low molecular hydrocarbon. Thus, the pyrolysis gas and the pyrolysis residue obtained from the pyrolysis furnace are treated separately. The cleaned gas obtained in the process is stored in a gas holder and can be supplied to a gas engine, a boiler, the pyrolysis chamber, or any other unit as required. Although the gas is cleaned in several steps, the system does not provide cleaning from $CO_2$, and this does not allow increase of the calorie-content in the produced gaseous fuel.

U.S. Patent Application Publication No. 20059939650 published in 2005 (inventors C. Cole, et al.) describes a pyrolytic waste-treatment reactor supported in a manner that causes minimal movement or flexing of the chamber under effect of temperature changes. Wastes are mixed in the reactor by means of a single bladed shaft.

U.S. Pat. No. 6,619,214 issued in 2003 to W. Walker discloses a method and apparatus for treatment of wastes. The apparatus comprises four major cooperating subsystems, namely a pyrolytic converter, a two-stage thermal oxidizer, a steam generator, and a steam turbine driven by steam generated by the steam generator. In operation, the pyrolytic converter is heated without any flame impinging on the reactor component, and the waste material to be pyrolyzed is transported through the reaction chamber of the pyrolytic converter by a pair of longitudinally extending, side-by-side material transporting mechanisms. However, the system is designed only for afterburning of the gas and does not teach the subsequent use of the gaseous product as a fuel for a power generator. Although the waste feeder is made in the form of two parallel augers, the latter transport the wastes without effective mixing.

U.S. Patent Application Publication No. 20070113761 published in 2007 (inventors C. Cole, et al.) discloses a pyrolytic waste-treatment reactor with dual knife gate valves. The apparatus has a thermal chamber, a feed-stock inlet coupled to the thermal chamber for feeding the waste material into the thermal chamber, a heater that heats the thermal chamber, and at least one dual knife gate valve positioned in the apparatus for restricting the passage of the waste material through an interior space of the apparatus and for limiting introduction of gas into the thermal chamber. The dual knife gate valve has at least one movable blade that moves toward another blade. The wastes are moved without effective mixing.

U.S. Patent Application Publication No. 20070186829 published in 2007 (inventors C. Cole, et al.) discloses a variable speed pyrolytic waste treatment system comprising a pyrolysis chamber and a movement mechanism adapted to move waste through the pyrolysis chamber at different speeds along the length of the pyrolysis chamber. The main conception of this system is to vary the rate of movement of material through a pyrolysis chamber. In particular, material might move at a slower rate when it first enters the chamber and move at a faster rate after it has been heated and as is moved toward the chamber exit. The movement mechanism contains two shafts that are provided with screwed which covert into blades. The shafts rotate in opposite directions and therefore take the material from the central area and transfer it to the periphery of the chamber.

U.S. Patent Application Publication No. 20070289507 published in 2007 (inventors W. Parrott, et al.) discloses a system, method and apparatus for pyrolyzing wastes to produce a gaseous fuel and any remaining material in a plurality of chambers The gaseous fuel may be sent to an afterburner where other elements may be added to generate heated gas having a predetermined temperature. The heated gas may be used in a variety of devices, such as a heat exchanger, or the like. However, the system is not provided with a material crusher and dryer.

U.S. Patent Application Publication No. 20080236042 published in 2008 (inventor J. Summerlin) discloses a rural municipal waste-to-energy system and method converting waste to fuel gas through anaerobic digestion (AD) and pyrolysis/gasification. Fuel gases derived during the processes are combined and used to generate electricity. The amount of municipal solid wastes normally collected by a municipality may be inadequate in volume to produce enough fuel gas with which to generate electricity sufficient to serve the entire community. It may be necessary, therefore, for additional wastes from the surrounding area to be included. The municipality must have its own public electric utility to be able to charge rates necessary for profitability. A waste-drying step is not included, and the syngas is mixed with a biogas without any preliminary cleaning.

U.S. Patent Application Publication No. 20090020052 published in 2008 (inventors F. Becchetti, et al.) describes a process for solid waste treatment, and particularly municipal solid waste, with recovery of the thermal energy, which is based on the general pyrolysis process modified in order to improve, on the one hand, the energy yield and, on the other, to reduce the quantity of unusable solid residues to be sent to the waste disposal, the unusable solid waste being limited to 10-15% of the total weight of the initial residue. The process and relative plant include a boosted treatment of the incoming waste, with a preliminary separation into three solid fractions, the first one of which is separately subjected to a preliminary drying step and the third one undergoes further shredding. The process and relative plant also include a section for recovering energy from the pyrolysis coke, wherein the latter is subjected to a thermochemical treatment with the production of a further quantity of synthesis gas. The system offers drying only of those wastes the fraction of which does not exceed 80 mm, while waste fractions ranging from 80 mm to 300 mm are not subject to drying. The syngas is subjected to afterburning without pre-cleaning, although the flue gas obtained after afterburning allows generation of steam for use in a boiler and is cleaned prior to exhaust into the atmosphere. Electricity is generated by a steam turbine. The patent does not teach utilization of the coke residue that remains after the process.

Known in the art also are plasma waste processing systems (see, e.g., U.S. Pat. No. 7,394,041 issued in 2008 to W. Choi). However, the plasma process is applicable only to treatment of gaseous products. Therefore, prior to treating the wastes by plasma, it is necessary to covert the solid wastes into a gaseous state. For example, U.S. Pat. No. 5,544,597 issued in 1996 to S. Camacho discloses plasma pyrolysis and vitrification of municipal wastes. Municipal mixed solid wastes are delivered to a processing facility where it is compacted before being placed into a reactor. The compaction apparatus serves to remove most of the air and some of the water from the waste as well as to seal the reactor against air infiltration. A transfer apparatus, in response to a signal relating to the height of waste in the reactor, sequentially deposits blocks of compacted waste in the top of the reactor when the height is low. The reactor has a pivotally and extensively mounted plasma arc torch as a heat source which is effective to pyrolyze organic waste components to generate desired by-product gases. Air and steam are added in controlled quantities to improve the operational efficiency and the by-product gas composition. The residual materials which do not pyrolyze are melted and cooled into a substantially inert vitrified mass.

A disadvantage of plasma pyrolysis systems is that such systems require gasification of solid wastes which is associated with additional expenses. Another problem is associated with the generation of hazardous gases such as dioxins and furanes which are formed after cooling of the plasma products to a temperature below 500° C., if the wastes were treated at temperature above 1200° C. for less than 2 sec.

Another disadvantage of plasma systems is that such systems work at temperature of 2500 C to 5000 C. Such temperatures deteriorate structural materials of the system and lead to frequent and expensive maintenance and repairs.

Analysis of the known waste-processing systems based on pyrolytic treatment of wastes shows that a majority of these systems involves afterburning of the syngas either in a separate burning chamber or in a separate section of the pyrolysis reactor. The flue gases obtained as a result of afterburning are used for generation of steam or electric energy in steam turbines that have energy-generation efficiency lower than gas-turbine co-generators. Some systems offer to use the syngas for generation of energy in gas-turbine generators. However, in some cases the syngas is used as a component for a mixture with biogas without pre-cleaning, and in other cases the syngas is not separated from $CO_2$ and therefore has low energy-generation efficiency. Another disadvantage of the known waste-processing systems is a lack of an efficient mechanism for feeding and mixing materials in pyrolysis chambers, a relatively high metal-to-power ratio in the structure of the pyrolysis chamber and, hence, high manufacturing cost, and incomplete cleaning of the gases, which are exhausted through the upper channel of the chamber together with the syngas, from fine waste particles.

OBJECT AND SUMMARY OF THE INVENTION

It is an object of the invention to provide a novel method and system for wasteless pyrolytic processing and complete utilization of municipal and domestic wastes. It is another object to provide the aforementioned system that allows a high degree of purification of gas and more efficient generation of energy in gas-turbine co-generators. It is a further object to provide the aforementioned method and system that separate $CO_2$ from the syngas and utilize the separated $CO_2$ as an additional commercial product along with decrease in concentration of harmful components in the gas exhausted to the atmosphere. Still another object is to provide the aforementioned system that does not require separate collection of wastes of different types. One more object is to provide the above system that does not leave by-products such as a coking residue. Still another object is to provide the aforementioned system that is capable of working in a self-contained mode and at the same time producing energy for external consumers.

The waste-processing system of the invention is intended for processing solid municipal and domestic wastes (hereinafter referred to merely as "wastes"). The system comprises the following modules connected in series: a waste pre-treatment and feed module, a pyrolysis reactor, a syngas cleaning module, and an energy generation unit.

The waste pre-treatment and feed module consists of a waste-sorting unit capable of sorting the untreated wastes and simultaneously removing those waste components that have low energy potential and do not contain hydrocarbons. In this unit, the sorted wastes can be combined with additional wastes having high content of hydrocarbons. Other units included into the waste pre-treatment and feed module comprise a waste-mixture grinder, a ground-waste drier, and a dry-waste accumulator that stores the waste dried to a predetermined level and has means for continuing supply of the ground and dried waste to the pyrolysis reactor. The latter has a retort that forms a pyrolysis chamber which is isolated from access of oxygen and contains a pair of waste-feeding screws.

Mechanisms of loading of the wastes into the pyrolysis reactor and of unloading of solid products of the reaction, such as coke, are similar to each other in that each of these mechanisms comprises an upper and lower slide valves or gates. Waste loading mechanism is installed on the front or proximal cover of the pyrolysis reactor, and the coke unloading mechanism is installed on the rear or distal cover of the pyrolysis reactor. The wastes fall from the waste accumulator onto the closed upper gate. Then the upper gate is opened, and the wastes fall onto the lower gate. After accumulation of a predetermined amount of the wastes, the upper gate is then closed, and the lower gate is opened allowing the wastes to fall onto the loading screw that moves the wastes to a spring-loaded gate. When the wastes are compacted to a degree that exceeds the holding threshold of the spring-loaded gate, the latter is shifted away under waste pressure and let the load to enter the space between the thread surfaces of the waste-feeding screws inside the interior of the retort. Such a two-gate spring-loaded gate prevents small particles of the wastes from *being carried away into the oxidizer without being pyrolyzed, decreases penetration of oxygen-containing atmospheric air into the retort. The waste-feeding screws have a variable pitch, which decreases in the direction of movement of the material. This allows for reducing the volume occupied by the wastes and thus to reduce the volume of air in the wastes. The air-displacement force is adjusted by the mass of a cover secured on an axle.

The reactor-unloading mechanism has a similar two-gate mechanism but differs from the loading mechanism in that the material unloaded from the reactor is coke and that it does not have a feed screw and a spring-loaded gate.

In a cross-section, the retort has a three-lobe shape with two lower lobes that form cavities for respective waste-feeding screws and an upper lobe that forms a syngas-passage cavity with vertical walls. The longitudinal axis of the upper cavity is horizontal. The waste-feeding screws are driven into rotation from a hydraulic motor via a gear reducer. The lower cavities and the waste-feeding screws have a tapered shape with peripheral surfaces of the screw threads located in close heat-transfer proximity with the inner walls of the retort. The threads of the waste-feeding screws overlap each other without physical contact and leave a space between the thread surfaces so that the feeder operates similar to a gear pump by effectively mixing the waste material while feeding it forward to the distal end of the pyrolysis reactor, i.e., to the end that is located on the side of the syngas cleaning module. The aforementioned gap prevents the wastes from accumulation inside the retort. Furthermore, the aforementioned gap is separated into two parts by an edge that divides the flow of the mixed wastes into two separate sub-flows. This provides movement of the wastes along the walls of the pyrolysis reactor and prolongs time of contact of the wastes with the hot walls of the retort, thus improving efficiency of the process. The waste-feeding screw is assembled from several sections that can be separated from each other and are connected through the use of conical threaded elements. The screw shaft is hollow and its interior is provided with thermal insulation. The areas of connection of the screw elements are free of the insulation for more efficient cooling of these portions of the waste-feeding screws. The cooling medium is air that is passed through the hollow screws through inlet and outlet devices installed at the respective ends of each waste-feeding screw. Longitudinal axes of the tapered waste-feeding screws are inclined with the distal ends (i.e., the ends at the unloading position of the chamber) being lower than the proximal ends (i.e., ends at the loading position of the chamber). The waste-feeding screws are not only tapered and inclined in the vertical plane, but also converge in a horizontal plane. More specifically, the inclination angle of the screws in the vertical plane down from horizontal level ranges from 1.5° to 3° and has an optimal value of 2.04°. The convergence angle of screws in the horizontal plane from proximal ends to the distal ends ranges from 1.8° to 3° and has an optimal value of 2.22°. The maximal diameter of the screw thread at the proximal end ranges from 1000 to 1200 mm with the optimal value of 1200 mm. The minimal diameter of the screw thread at the distal end ranges from 550 mm to 650 mm with the optimal value of 600 mm. The aforementioned mounting angles can be adjusted in the range of ±30 minutes, preferably ±10 minutes. Adjustment of the angles makes it possible to set the gaps between the walls of the retort and the screws. Adjustment is carried out with the use of eccentric bushes installed in support units of the respective covers.

The three-lobed retort is surrounded by an external casing that has a hexagonal cross-section and walls made from a refractory material. The interior space between the inner walls of the external casing and the outer surface of the retort forms a furnace for burning a fuel gas that generates heat for heating the interior of the pyrolysis chamber and hence for causing a pyrolytic exothermic reaction inside the chamber. The fuel gas may comprise an externally supplied natural gas or gas generated as a result of pyrolysis. The fuel gas is supplied to the burners arranged under the lower cavities of the retort. The thermal energy generated by burning the fuel gas in the furnace is transmitted to the interior of the pyrolysis chamber through the chamber walls. The pyrolysis temperature in the chamber ranges from 800° C. to 1000° C., preferably from 850° C. to 900° C. Automatic control keeps the temperature with the prescribed optimal range and shuts the burner on or off, depending on the temperature conditions.

Among the burners, at least one may be designated for burning the coke obtained as a result of pyrolysis. In this case, the burning chamber of the pyrolysis reactor does not need a supply of an external heat. The coke obtained in the rector is purified in a centrifuge from residue of metals, glass, etc. and is burned on the aforementioned burner. Thus, the reactor may operate on gas fuel and coke without supply of the external heat.

The outlet end of the retort is connected to a centrifuge that receives the coking carbonaceous pyrolysis residue from the retort of the pyrolysis reactor and separates those low-energy components that have not been separated from the waste mix at the earlier stages from the coking carbonaceous residue of the pyrolysis process. Another function of the centrifuge is mixing of the dehydrated tar and chlorine-, fluorine-, and sulfur-containing components separated from the syngas together with the mixture of the coking carbonaceous pyrolysis residue.

The pyrolysis reactor is further provided with means-for simultaneous removal and supply of heat and/or flue gases obtained in the pyrolysis reaction to the ground-waste drier of the waste pre-treatment and feed module.

The pyrolysis reactor is also provided with means for simultaneous removal of syngas obtained in the pyrolysis reaction and for sending a portion of this syngas to the furnace of the reactor as an addition source of heat.

The syngas cleaning module comprises a dry cleaning unit with a dust catcher (not shown) and a wet-syngas cleaning stage where the syngas is cleaned from tar and chlorine-, fluorine, and sulfur-containing admixtures. The wet-cleaning stage consists of a first wet syngas cleaner, where the syngas is cleaned with water, and a second wet syngas cleaner, where the syngas is cleaned with an alkali. A gas cooler, which is located between the dry cleaning unit and the first wet syngas cleaner, is intended for cooling the syngas prior to the supply of the gas to wet cleaning.

The wet syngas cleaners are connected to a floatator that separates water from the remaining impurities. The mixture of water with impurities is sent to a floatator via pipes. This unit produces process water that can be further utilized. The outlet end of the floatator is connected to the centrifuge of the pyrolysis reactor and may supply the dehydrated tar, chlorine-, fluorine, and sulfur-containing components through the centrifuge, where these components are combined with the mixture of the coking carbonaceous residue of the pyrolysis process. Then this mixture is sent back to the furnace of the pyrolysis reactor for burning together with the aforementioned mixture and thus for maintaining the working temperature of pyrolysis inside the reactor.

The wet-cleaning stage is also connected to an absorber, which separates a $CO_2$-saturated aqueous solution and thus for separation of at least a reusable gaseous carbon dioxide from the syngas. The $CO_2$-saturated aqueous solution is then delivered to the desorber for subsequent decomposition of the solution into $CO_2$ and processing water.

The energy-generation module of the system is made in the form of a gas-turbine co-generator that is connected to the outlet of the absorber and generates electric and heat energy by burning syngas purified from possible contaminated components and obtained from the absorber. The co-generator uses the syngas obtained from the absorber as a working medium. The electric energy is transmitted to customers via a transformer substation and power lines.

The system operates in a continuous mode as follows.

First the municipal and domestic wastes that are intended for processing are sorted by means of the waste-sorting unit capable of sorting the wastes and simultaneously removing those waste components that have low energy potential and do not contain hydrocarbons. If necessary, the sorted wastes are combined in this unit with additional wastes having high content of hydrocarbons. The presorted wastes are then fed to the waste-mixture grinder where the wastes are ground to a predetermined size, e.g., 50 mm. The grinder may be of any type if it is able to grind the treated waste. The ground wastes are fed to a dryer where the ground wastes are dried at a predetermined temperature, e.g., in the range of from 150 to 250 ° C. until the content of moisture in the wastes reached the level of about 20%. The dryer may be of a drum-type and may operate on the basis of the heat obtained from the output of the pyrolysis reactor. From the dryer the wastes are sent to the dry-waste accumulator that stores the waste dried to a predetermined level and has means for continuing supply of the ground and dried waste to the pyrolysis reactor. The mechanisms of loading of the wastes into the pyrolysis reactor feeds the reactor by means of the feeding screw via the aforementioned double-gate structure. The wastes fall from the waste accumulator onto the closed upper gate. After accumulation of a predetermined amount of the wastes, the upper gate is opened, and the wastes fall onto the lower gate. The upper gate is then closed, and the lower gate is opened allowing the wastes to fall onto the loading screw that moves the wastes to a spring-loaded gate. When the wastes are compacted to a degree that exceeds the holding threshold of the spring-loaded gate, the latter is shifted away under waste pressure and allows the load to enter the interior of the retort.

In the pyrolysis reactor, the wastes are subjected to a pyrolysis treatment by being heated without access of oxygen to a temperature in the range of 800° C. to 1000° C. The product is conveyed from the loading side to the unloading side of the reactor due to rotation of the tapered screws that converge in the horizontal plane and are inclined in the downward direction in the vertical plane. The material is transported through the gap between the threads of the screws and at the same time is effectively mixed by the rotation of the screws.

As a result of the pyrolysis, the treated product is decomposed into a solid phase (a mixture of carbon residue that contains coke and tar, and a gaseous phase (syngas). A part of the heat and flue gas developed in the pyrolysis reactor furnace is sent to the waste drier. A part of the syngas developed in the pyrolysis reactor is sent to the burners of the reactor for use as an additional fuel for maintaining the pyrolysis process temperature at a required level. The coking carbon residue is sent to a centrifuge for purification and separation of low-energy residue that does not contain hydrocarbons and that could not be removed from the wastes at the sorting stage. The carbon residue (with 2 to 10% of carbon) is then sent back to the burners of the reactor for afterburning.

From the pyrolysis reactor, the syngas is sent to the dry-cleaning unit with the dust catcher where the level of dust in the syngas is reduced, and the syngas is then passed through the first stage of the wet scrubber when the syngas is cleaned by a flow of water from tar and chlorine-, fluorine-, and sulfur-containing admixtures. The syngas is then fed to the second wet-stage of scrubbing with subsequent removal of the separated impurities. From both wet-stages of scrubbing, the mixture of water with impurities is sent to a floatator that produces process water suitable for further appropriate use. Meanwhile, dehydrated tar and mixture of dehydrated impurities are sent to a centrifugal pump for mixing with the coking carbonaceous residue of the pyrolysis process and from there to the reactor burners for afterburning.

The syngas purified from the tar and the chlorine-, fluorine, and sulfur-containing admixtures is fed to an absorber that produces a $CO_2$-saturated aqueous solution, which is sent to the disrober with subsequent decomposition of the solution into $CO_2$ and processing water. The purified syngas is fed to a power co-generator (of a piston or a gas-turbine type), where the gas is used as the co-generator fuel. The co-generator produces electric energy that can be used for purposes required, while heat that was removed from the co-generator can be utilized or converted in accordance with specific demand.

DETAILED DESCRIPTION OF THE INVENTION

As has been mentioned above, the invention relates to a method and system for processing and utilizing solid municipal and domestic wastes by pyrolytic treatment.

Figure 1:
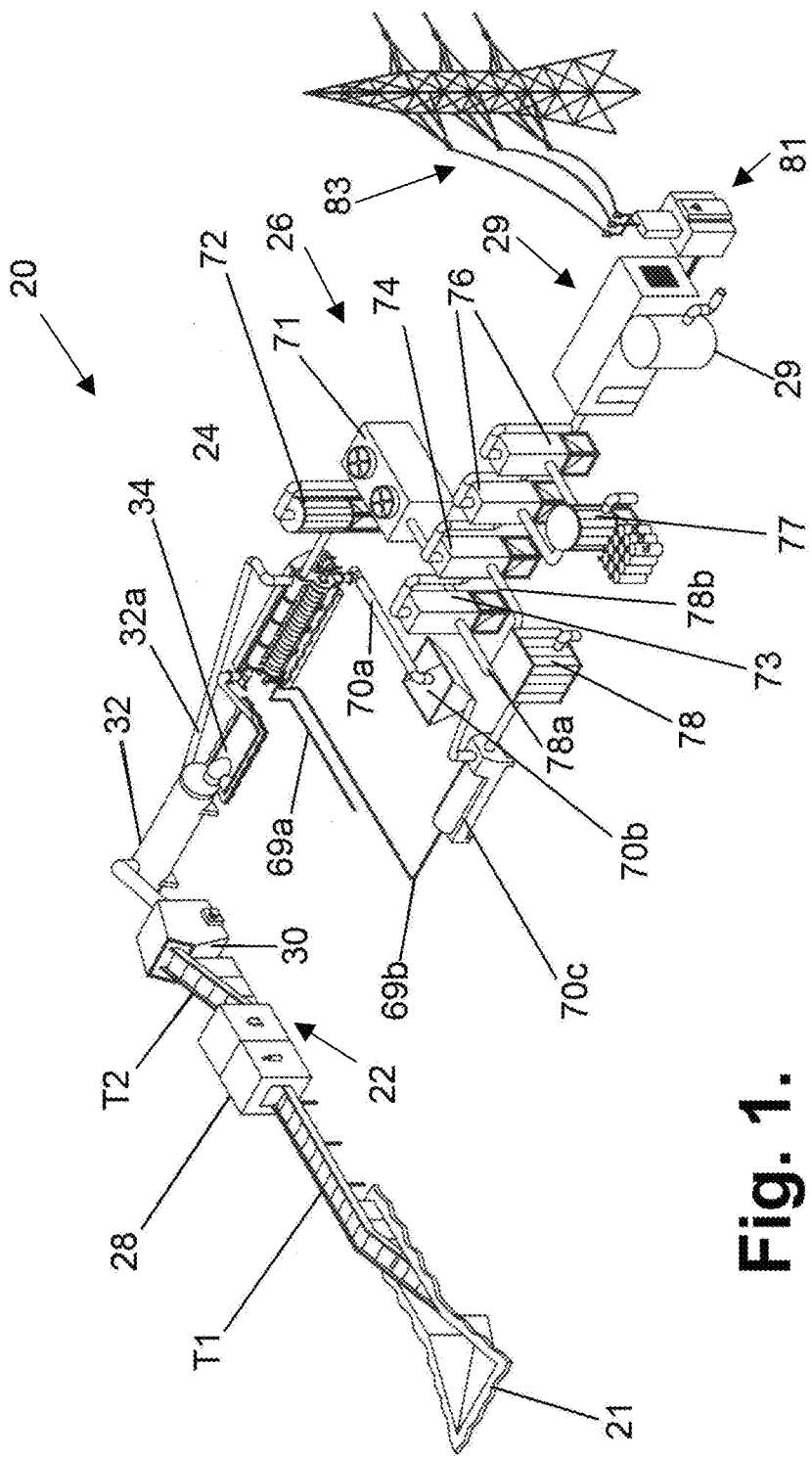
FIG. 1 is a block-diagram of the system for processing and utilizing solid industrial, municipal, and domestic wastes by pyrolytic treatment.

A block-diagram of the system of the invention for processing and utilizing solid municipal and domestic wastes by pyrolytic treatment is shown in FIG. 1.

The system, which as a whole is designated by reference numeral 20, comprises the following main modules connected in series: a waste pre-treatment and feed module 22, a pyrolysis reactor 24, a syngas cleaning module 26, and an energy generation unit 29.

The waste pre-treatment and feed module 22, in turn, consists of a waste reception site 21, a linear conveyor T1, a waste-sorting unit or a sorter 28 that received the untreated wastes from the linear conveyor T1 and is capable of sorting untreated wastes and simultaneously removing those waste components that have low energy potential and do not contain hydrocarbons. In this unit, the sorted wastes can be combined with additional wastes having high content of hydrocarbons. Other units included into the waste pre-treatment and feed module 22 comprise a waste-mixture grinder 30, which is connected to the sorter by a second linear conveyor T2, a ground-waste drier 32, and a dry-waste accumulator 34 that stores the waste dried to a predetermined level and has means for continuing supply of the ground and dried waste to the pyrolysis reactor 24. Reference numeral 32a designates a pipe that connects the outlet of the reactor 24 to the dryer 32 for sending a part of the flue gases used to heat the reactor from the reactor furnace to the dryer for the supply of addition heat.

As a result of a pyrolysis reaction that takes place in the pyrolysis reactor 24, the wastes are decomposed at least into a syngas and solid products of pyrolysis, such as coke.

Figure 2:
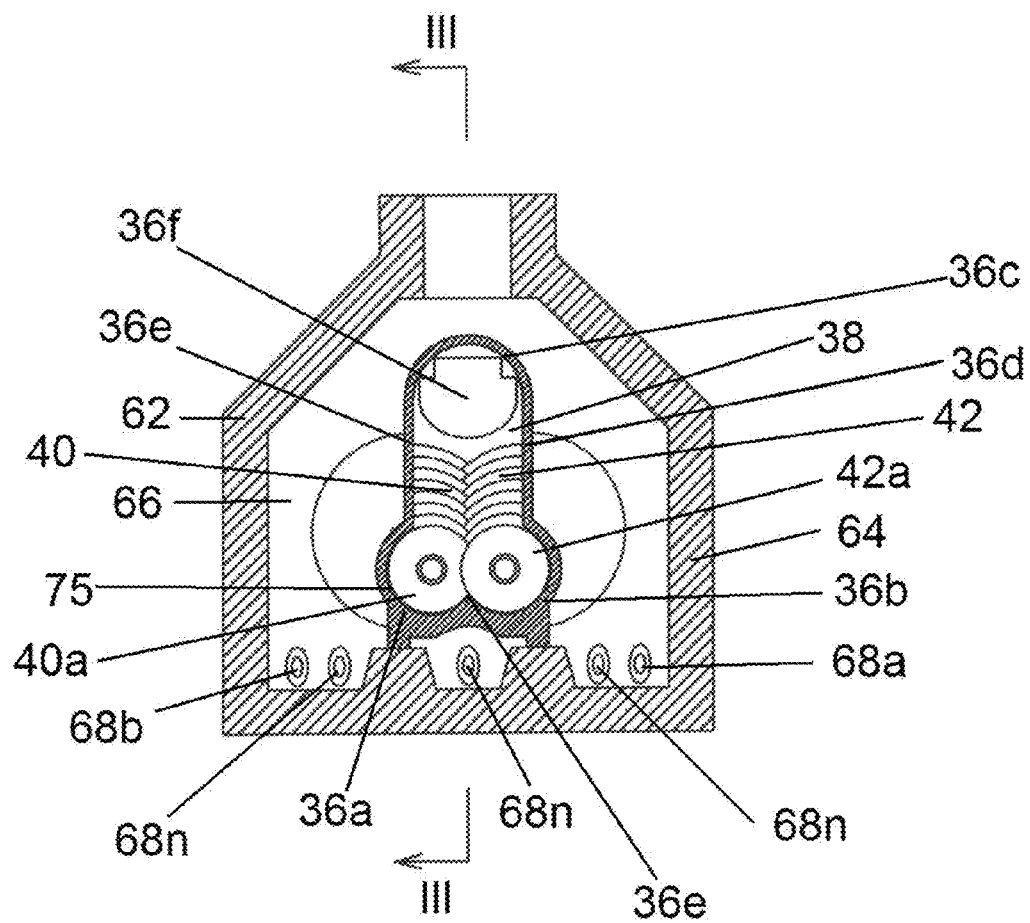
FIG. 2 is a cross-sectional view of the pyrolysis reactor along line II-II of FIG. 3.
Figure 3:
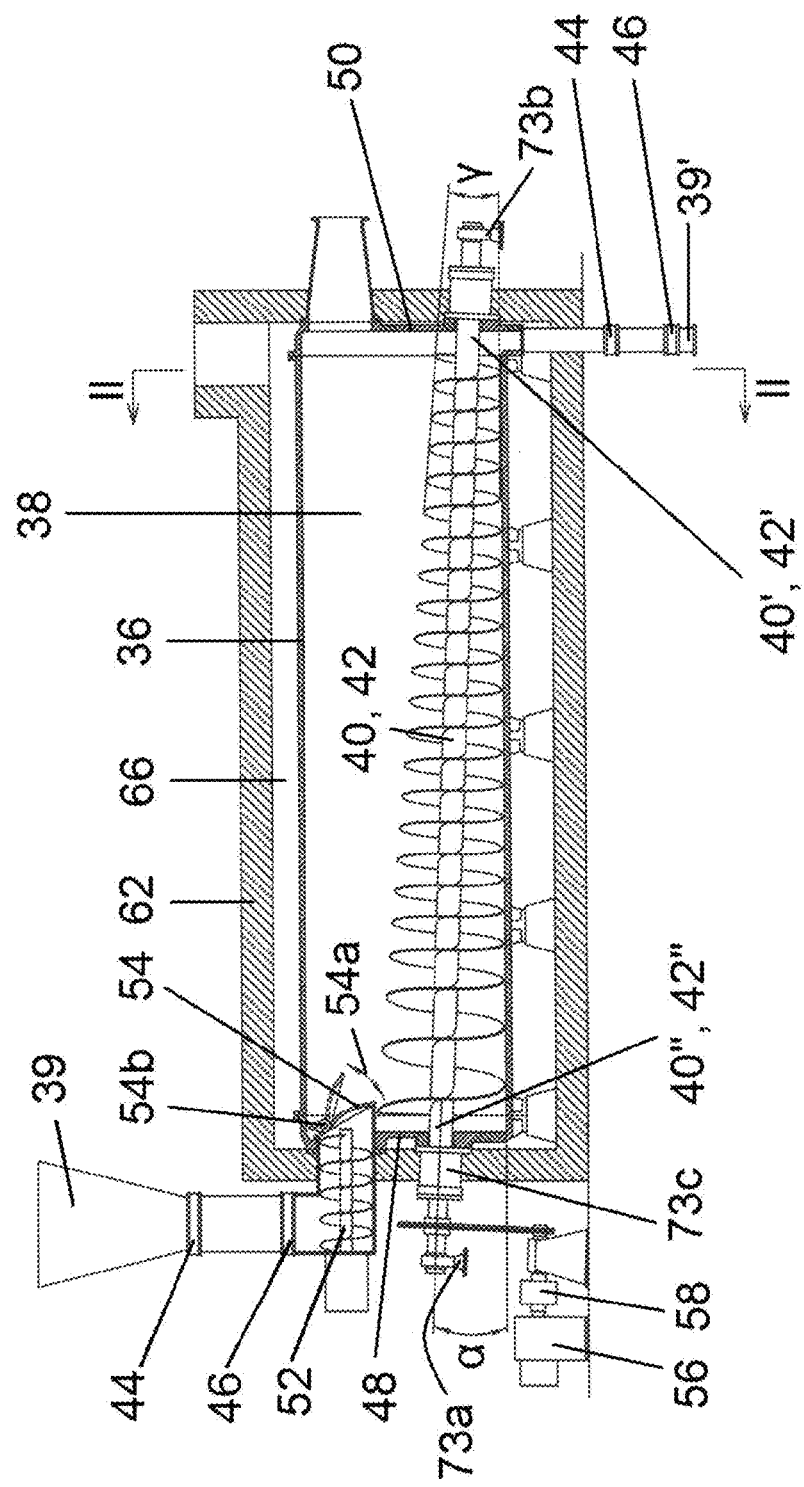
FIG. 3 is a longitudinal sectional view of the reactor along line III-III of FIG. 2.
Figure 4A:
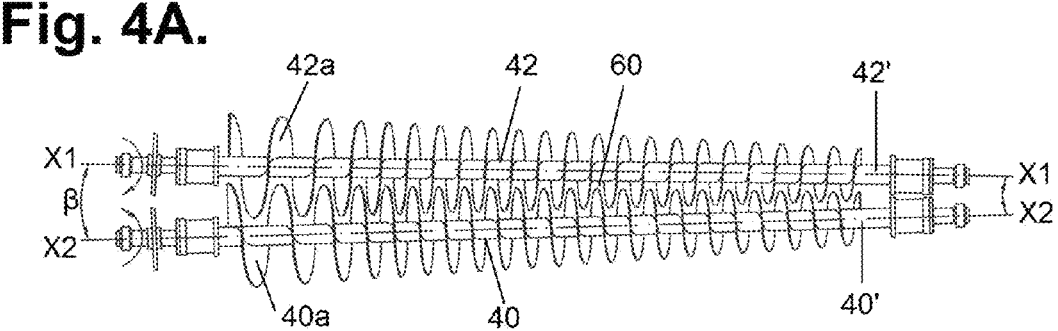
FIG. 4A is a top view of two waste-feeding screws used in the pyrolysis reactor.

A cross-sectional view of the pyrolysis reactor 24 along line II-II of FIG. 3 is shown in FIG. 2. FIG. 3 is a longitudinal sectional view of the reactor 24 along line III-III of FIG. 2. The reactor 24 has a retort 36 that forms a pyrolysis chamber 38, isolated from access of oxygen, and contains a pair of waste-feeding screws 40 and 42. Both waste-feeding screws 40 and 42 are seen in FIG. 4A, which is a top view of the waste-feeding screws.

Figure 5:
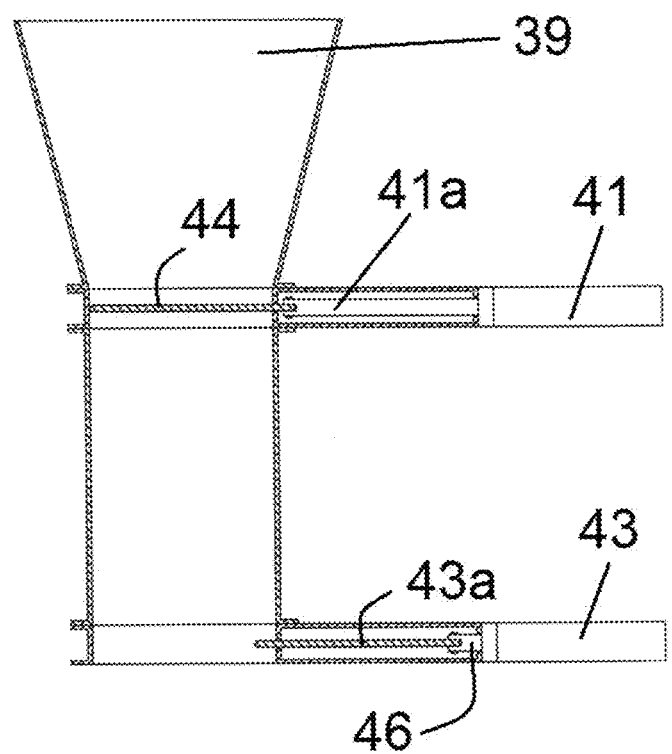
FIG. 5 is a sectional view of the reactor loading (unloading) mechanism.

A mechanism 39 for loading of the wastes into the pyrolysis reactor 24 is shown in FIG. 5. The mechanism 39' for unloading of solid products of the reaction, such as coke, respectively, is similar to that shown in FIG. 5 and therefore is not shown and not considered separately. Each above-mentioned mechanism comprises upper and lower valves, e.g., sliding gates 44 and 46, which are shown in FIG. 5. The waste-loading mechanism 39 is installed on the front or proximal cover 48 (FIG. 3) of the pyrolysis reactor 24, and the coke-unloading mechanism (not shown) is installed on the rear or distal cover 50 of the pyrolysis reactor 24. In the modification shown in FIG. 5, the gates 44 and 46 are driven linearly into and from the open and close positions by respective pneumatic cylinders 41 and 43, the piston rods 41a and 43a of which are connected to respective gates 44 and 46.

The wastes fall from the waste accumulator 34 (FIG. 1) onto the closed upper gate 44 (FIGS. 3 and 5). Then the upper gate 44 is opened, and the wastes fall onto the lower gate 46. After accumulation of a predetermined amount of the wastes, the upper gate 44 is then closed, and the lower gate 46 is opened allowing the wastes to fall onto the feeding screw 52 (FIG. 3) that moves the wastes to a spring-loaded gate 54 installed at the inlet opening of the front cover 50 of the reactor 24 (FIG. 3).

Figure 4B:
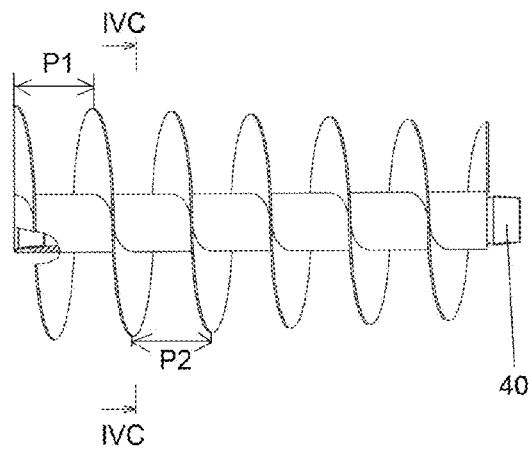
FIG. 4B is a fragmental partially sectional longitudinal view of a screw element.

When the wastes are compacted to a degree that exceeds the holding threshold of the spring-loaded gate 54, the latter is shifted away under waste pressure into a position shown in FIG. 3 by imaginary line 54*a* and allows the load to enter the space between the thread surfaces 60 (FIG. 4A) of the waste-feeding screws inside the retort 36. Such a two-gate spring-loaded gate prevents small particles of the wastes from being carried away into the oxidizer without being pyrolyzed and prevents penetration of oxygen-containing atmospheric air into the retort. The waste-feeding screws 40 and 42 have a pitch that decreases in the direction of movement of the material. This is shown in FIG. 4B, which is a fragmental longitudinal partially sectional view of a screw element. As can be seen from FIG. 4B, the waste-feeding screw 40 (which is the same as the waste-feeding screw 42) has the pitch that decreases in the direction of movement of the material. In other words, pitch P1 is greater than pitch P2, and pitch P2 is greater than pitch P3, etc. The diminishing pitch makes it possible to reduce the volume of the waste being treated and thus to reduce the volume of air contained in the treated wastes. The force of air displacement can be adjusted by the mass of a pivotal spring-loaded gate 54 pivotally supported by an axle 54*b* (FIG. 3).

As has been mentioned above, the reactor unloading mechanism 39' is similar to the loading mechanism, except that the material unloaded from the reactor is coke. In view of the similarity with regard to the loading mechanism, the unloading mechanism 39' is not described in detail.

As can be seen from FIG. 2, in a cross-section the retort 36 has a three-lobe shape with two lower lobes 36*a* and 36*b* that form cavities for respective waste-feeding screws 40 and 42 and an upper lobe 36*c* that has vertical walls 36*d* and 36*e* and that defines a syngas-passage cavity 36*f*. The screws are driven into rotation from a hydro motor 56 via a gear reducer 58 (FIG. 3).

As can be seen from FIG. 2, the waste-feeding screws 40, 42 have tapered shapes with helical peripheral surfaces of the screw threads 40*a* and 42*a* located in close heat-transfer proximity with the inner wall 36*c* of the retort 36. The threads 40*a* and 42*a* of the waste-feeding screws overlap each other (FIG. 4A) without physical contact and leave a space 60 (FIG. 4) between the helical surfaces of the threads 40*a* and 42*a* surfaces so that the feeder, formed by the waste-feeding screws 40 and 42, operates similar to a gear pump by effectively mixing the waste material while feeding it forward to the distal end of the pyrolysis reactor 24, i.e., to the end that is located on the side of the syngas cleaning module 26 (FIG. 1).

The aforementioned gap 60 prevents the wastes from accumulation inside the retort 36. Furthermore, the aforementioned gap 60 is separated into two parts by an edge 61 that divides the flow of the mixed wastes into two separate sub-flows. This provides movement of the wastes along the walls of the retort 36 and prolongs time of contact of the wastes with the hot walls of the retort 36, thus improving efficiency of the process.

Figure 4C:
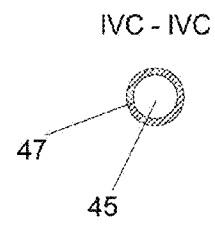
FIG. 4C is a cross sectional view along line IVC-IVC of FIG. 4B.

Each waste-feeding screw is assembled from several sections of the type shown in FIG. 4B that can be separated from each other and are connected through the use of conical threaded elements 43. As shown in FIG. 4C, which is a cross-section along line IVC-IVC of FIG. 4B, the waste-feeding screw 40 (42) is hollow and its interior 45 is provided with thermal insulation 47. The areas of connection of the screw elements are free of the insulation for more efficient cooling of these portions of the waste-feeding screws. The cooling medium is air that is passed through the interior 45 of the hollow waste-feeding screws via inlet and outlet devices 73*a* and 73*b* installed at loading side and unloading side of the retort, respectively.

Figure 4D:
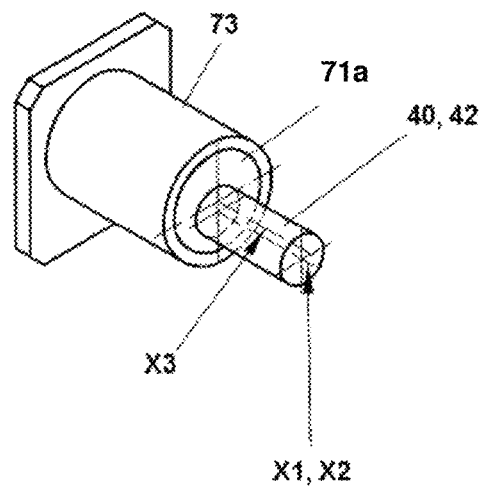
FIG. 4D is a three-dimensional view of an eccentric bush on the shaft of the screw used for adjusting the gap between the outer surface of the screw and the inner surface of the retort in the pyrolysis reactor of the invention.

Longitudinal axes X1 and X2 (FIG. of the tapered waste-feeding screws 40 and 42 are inclined (FIG. 3) with the distal ends 40' and 42', respectively (i.e., the ends at the unloading position of the chamber 38), lower than the proximal ends 40" and 42" (i.e., ends at the loading position of the chamber). As can be seen from FIG. 4A, the waste-feeding screws are not only tapered and inclined in the vertical plane, but also converge in a horizontal plane (FIG. 4A). More specifically, the inclination angle α a of the waste-feeding screws in the vertical plane (FIG. 3) down from horizontal level ranges from 1.5° to 3° and has an optimal value of 2.04°. In FIGS. 3 and 4 the angles are shown in an exaggerated form. The convergence angle β of the screws 40 and 42 (FIG. 4A) in the horizontal plane from proximal ends 40" and 42" to the distal ends 40' and 42' ranges from 1.8° to 3° and has an optimal value of 2.22°. The maximal diameter of the screw threads at the proximal ends ranges from 1000 to 1200 mm with the optimal value of 1200 mm. The minimal diameter of the screw thread at the distal ends 40' and 42' ranges from 550 mm to 650 mm with the optimal value of 600 mm. The aforementioned mounting angles can be adjusted in the range of ±30 minutes, preferably ±10 minutes. Adjustment of the angles makes it possible to set the gaps between the walls of the retort 36 and the screws 40, 42. Adjustment is carried out by rotating an eccentric bush 71*a* of the type shown in FIG. 4D installed in support unit of the respective cover. FIG. 4D is a three-dimensional view of an eccentric bush 71*a* on the shaft of the screw 40 (42) used for adjusting the gap 75 (FIG. 2) between the outer surface of the screw and the inner surface of the retort 36 in the pyrolysis reactor 24 of the invention.

The three-lobed retort 36 is surrounded by an external casing 62 (FIG. 2) that has walls 64 made from a refractory material. The interior space 66 (FIGS. 2 and 3) between the inner walls of the external casing 64 and the outer surface of the retort 36 forms a furnace for burning a fuel gas and generates heat for heating the interior of the pyrolysis chamber 38 and hence for causing a pyrolytic exothermic reaction inside the chamber 38. The fuel gas may comprise an externally supplied natural gas that may be fed to the reactor via fuel supply line 69*a* (FIG. 1) or gas generated as a result of pyrolysis and fed to the reactor via a pipe (not shown). The syngas is supplied to the burners 68*a*, 68*b*, . . . 68*n* arranged under the lower cavities 36*a* and 36*b* of the retort 36. The thermal energy generated by burning the fuel gas in the furnace 66 is transmitted to the interior of the pyrolysis chamber 24 through the chamber wall 36*a*. The pyrolysis temperature in the chamber ranges from 800° C. to 1000° C., preferably from 850° C. to 900° C. Automatic control keeps the temperature within the prescribed optimal range and shuts the burners 68*a*, 68*b*, . . . 68*n* on or off, depending on the temperature conditions.

Among the burners, at least one, e.g., the burner 68*b*, (FIG. 2) may be designated for burning the coke obtained as a result of pyrolysis. In this case, the burning chamber 66 of the pyrolysis reactor 24 does not need a supply of an external heat. The coke obtained in the reactor 24 is fed with a screw conveyer 70*a* to a coke accumulator 70*b* and from the latter to a centrifuge 70*c* (FIG. 1), which is intended for purification of the coke from residue of metals, glass, etc. and for sending the purified coke back to the reactor 24 for burned on the aforementioned burner 68*b*. Thus, the reactor 24 may operate on gas fuel and coke without supply of the external heat.

When the centrifuge 70c (FIG. 1) receives the coking carbonaceous pyrolysis residue from the furnace 66 (FIG. 2) of the pyrolysis reactor 24, it separates those low-energy components that have not been separated from the waste mix in the waste pre-treatment and feed module 22 (FIG. 1) at the earlier stages of the process. Another function of the centrifuge 70c is mixing of the dehydrated tar and chlorine-, fluorine-, and sulfur-containing components separated from the syngas together with the mixture of the coking carbonaceous pyrolysis residue.

The pyrolysis reactor 24 is also provided with devices for simultaneous removal and supply of a portion of syngas obtained in the pyrolysis reactor to the burners 68a, 68b, ... 68n of the pyrolysis reactor 24 for use as an additional fuel maintaining the pyrolysis process temperature.

The syngas cleaning module 26 (FIG. 1) comprises a dry cleaning unit 72 with a dust catcher (not shown) and a wet-syngas cleaning stage 26 where the syngas is cleaned from tar and chlorine-, fluorine, and sulfur-containing admixtures. The wet-cleaning stage 26 consists of a first wet syngas cleaner 73, where the syngas is cleaned with water, and a second wet syngas cleaner 74, where the syngas is cleaned with an alkali. A gas cooler 71, which is located between the dry cleaning unit 72 and the first wet syngas cleaner 73, is intended for cooling the syngas prior to the supply of the gas to wet cleaning.

The wet syngas cleaners 73 and 74 are connected to a floatator 78 that separates water from the remaining impurities. The mixture of water with impurities is sent to a floatator 78 via pipes 78a and 78b. This unit produces process water that can be further utilized. The outlet end of the floatator 78 is connected to the centrifuge 70c of the pyrolysis reactor 24 (FIG. 1) and may supply the dehydrated tar, chlorine-, fluorine, and sulfur-containing components through the centrifuge, where these components are combined with the mixture of the coking carbonaceous residue of the pyrolysis process. Then the mixture is sent back via the pipeline 69b to the furnace 66 (FIG. 2) of the pyrolysis reactor 24 for burning together with the aforementioned mixture and thus for maintaining the working temperature of pyrolysis inside the reactor 24.

The wet-cleaning stage 26 is also connected to an absorber 76, which separates a $CO_2$-saturated aqueous solution and thus for separation of at least a reusable gaseous carbon dioxide from the syngas. The $CO_2$-saturated aqueous solution is then delivered to the desorber 77 for subsequent decomposition of the solution into $CO_2$ and processing water.

The energy-generation module 29 (FIG. 1) of the system 20 is made in the form of a gas-turbine co-generator 30a that is connected to the outlet of the absorber and generates electric and heat energy by burning syngas purified from possible contaminated components and obtained from the absorber 76. The co-generator 30a uses the syngas obtained from the absorber as a working medium. The electric energy is transmitted to customers via a transformer substation 81 and power lines 83.

Figure 6:
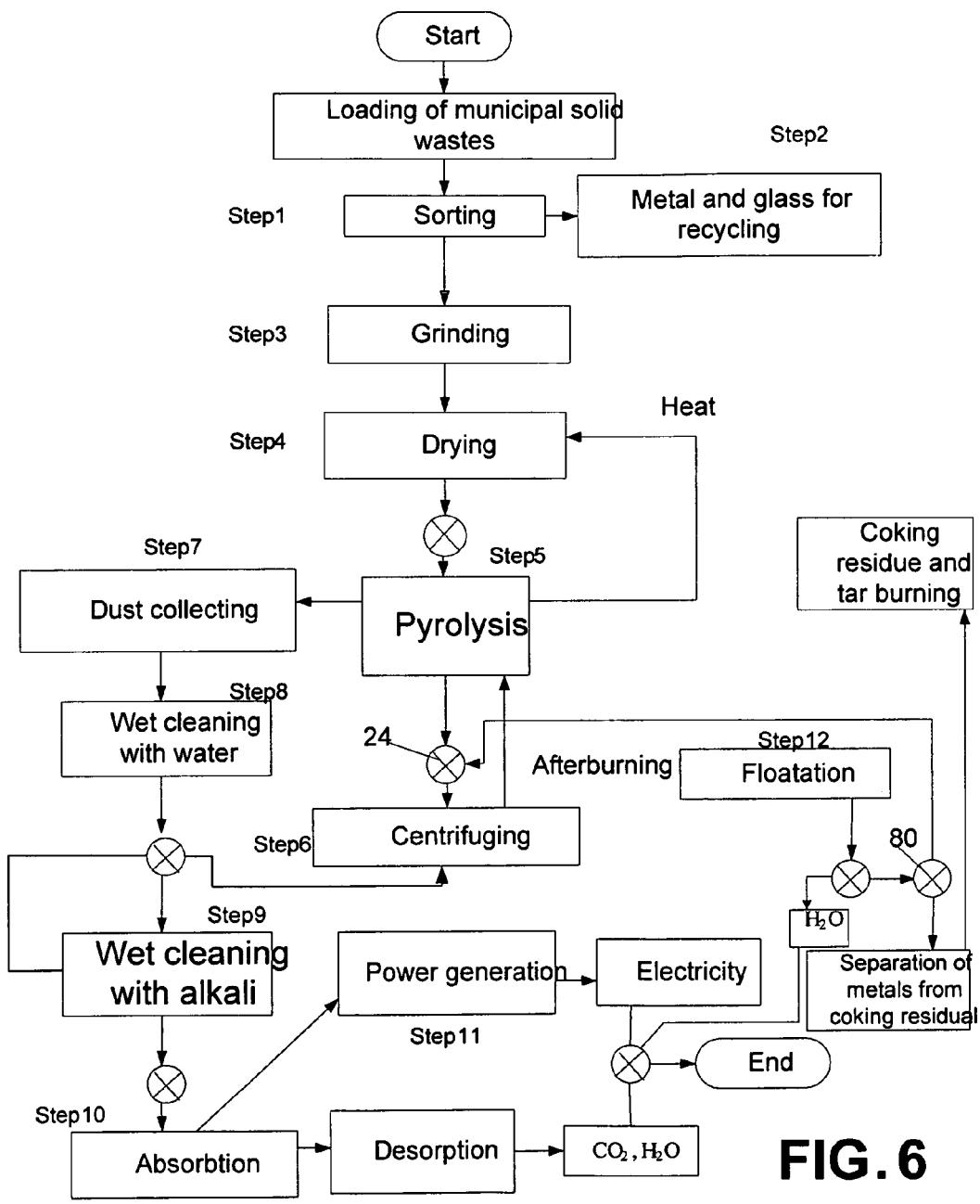
FIG. 6 is a flowchart that shows the process steps.

An operation of the system of the invention for processing and utilizing solid municipal and domestic wastes by pyrolytic treatment in will now be described with reference to FIGS. 1 and 6, where FIG. 6 is a flowchart that shows the process steps. First the municipal and domestic wastes that are intended for processing are sorted (Step 1) by means of the waste-sorting unit 28 (FIG. 1) capable of sorting the wastes and simultaneously removing those waste components that have low energy potential and do not contain hydrocarbons. If necessary, the sorted wastes are combined in this unit with additional wastes having high content of hydrocarbons.

The metals, glass, and similar solid impurities separated at this stage are removed and sent to recycling (Step 2).

The presorted wastes are then fed to the grinder 30 (Step 3) where the wastes are ground to a predetermined size, e.g., 50 mm. The ground wastes are then fed to a dryer 32 (Step 4) where the ground wastes are dried at a predetermined temperature, e.g., in the range of from 150 to 250 ° C. until the content of moisture in the wastes reached the level of about 20%. The dryer 32 may operate on the basis of the heat obtained from the output of the pyrolysis reactor 24.

From the dryer 32 the wastes are sent to the dry-waste accumulator 34 (FIG. 1) that stores the waste dried to a predetermined level and has means for continuing supply of the ground and dried waste to the pyrolysis reactor 24.

Mechanisms of loading the wastes into the pyrolysis reactor feed the reactor 24 by means of a feed screw (FIG. 3) via the aforementioned double-gate arrangement. The wastes fall from the waste accumulator 34 onto the closed upper gate 44 (FIG. 5). After accumulation of a predetermined amount of the wastes, the upper gate 44 is opened, and the wastes fall onto the lower gate 46. The upper gate 44 is then closed, and the lower gate is opened allowing the wastes to fall onto the loading screw 52 (FIG. 3) that moves the wastes to a spring-loaded gate 54. When the wastes are compacted to a degree that exceeds the holding threshold of the spring-loaded gate 54, the latter is shifted away under waste pressure and lets the load to enter the interior of the retort 36.

In the pyrolysis reactor 24, the wastes are subjected to a pyrolysis treatment (Step 5) by being heated without access of oxygen to a temperature in the range of 800° C. to 1000° C. The product is conveyed from the loading side to the unloading side of the reactor 24 due to rotation of the tapered screws 40 and 42 that converge in the horizontal plane and are inclined in the downward direction in the vertical plane. The material is transported through the space 60 (FIGS. 2 and 3) between the threads of the screws 40 and 42 and at the same time is effectively mixed by the rotation of the screws 40 and 42 (FIG. 4A).

As a result, of the pyrolysis, the treated product is decomposed into a solid phase (a mixture of carbon residue that contains coke and tar, and a gaseous phase (syngas). A part of the syngas developed in the pyrolysis reactor is sent to the waste drier and/or to the burners 68a, 68b, ... 68n (FIG. 2) of the reactor for use as an additional heat carrier. The coking carbon residue is sent to a centrifuge 70c for purification and separation of low-energy residue that does not contain hydrocarbons and that could not be removed from the wastes at the sorting stage (Step 6). The carbon residue (with 2 to 10% of carbon) is then sent back to the burners of the reactor 24 for afterburning.

From the pyrolysis reactor 24, the syngas is sent to the dry-cleaning unit 72, where the level of dust in the syngas is reduced (Step 7), and the syngas is then passed through the first stage of the wet scrubber when the syngas is cleaned by a flow of water (Step 8) from tar and chlorine-, fluorine, and sulfur-containing admixtures. The syngas is then fed to the second wet-stage of scrubbing with subsequent removal of the separated impurities with alkalis (Step 9). From the second wet-stage cleaner, the syngas is sent to absorption (Step 10) where the $CO_2$-saturated aqueous solution is separated from the syngas wherefrom the gas is sent to a power-generation, e.g., a gas-turbine co-generator 29 that generates electricity (Step 11).

From both wet-stages of scrubbing, the mixture of water with impurities is also sent to a floatator 78 that produces process water (Step 12) suitable for further appropriate use. Meanwhile, dehydrated tar and mixture of dehydrated impurities are sent to the centrifuge 70c for mixing with the coking carbonaceous residue of the pyrolysis process and from there to the reactor burners for afterburning.

The syngas purified from the tar and the chlorine-, fluorine-, and sulfur-containing admixtures is fed to an absorber that produces a $CO_2$-saturated aqueous solution, which is sent to the disrober 77 with subsequent decomposition of the solution into $CO_2$ and processing water.

Thus it has been shown that the invention provides a novel method and system for pyrolytic processing and more efficient utilization of municipal and domestic wastes as compared to conventional methods and systems of this type. The aforementioned system allows a high degree of purification of gas and more efficient generation of energy in gas-turbine co-generators. The system separates $CO_2$ from the syngas and utilizes the separated $CO_2$ as an additional commercial product along with decrease in concentration of harmful components in the gas exhausted to the atmosphere. The system does not require separate collection of wastes of different types. The method and system of the invention do not leave by-products such as a coking residue. The system is capable of working in a self-contained mode and at the same time produces energy for external consumers.

Although the invention has been shown and described with reference to specific embodiments, it is understood that these embodiments should not be construed as limiting the areas of application of the invention and that any changes and modifications are possible provided that these changes and modifications do not depart from the scope of the attached patent claims. For example, the retort and the external casing that surrounds the retort may have shapes different from those shown in the drawings and can be made from different heat-resistant materials. The loading and unloading mechanism of the pyrolysis reactor may have structures different from those shown in FIG. 5. For example, an electric driven can be used for opening and closing the sliding gates. The sliding gates may be replaced by rotating gates pivotally installed on the inner walls of the loading hopper.

The invention claimed is:

1. A system for processing and utilizing municipal and domestic waste comprising the following main modules connected in series: a waste pre-treatment and feed module, a pyrolysis reactor, a syngas cleaning module, and an energy generation unit, wherein the waste-pretreatment and feed module comprises: a waste-sorting unit for sorting the wastes to be treated and for removing untreatable items; a waste-mixture grinder for grinding the presorted wastes to produce ground wastes of a predetermined dimensions suitable for processing and utilization, the waste-mixture grinder being connected to the waste-sorting unit; a dryer for drying the ground wastes, the dryer being connected to the waste-mixture grinder; and a dry-waste accumulator with a loading mechanism and an unloading mechanism, the loading mechanism being connected to the dryer, and the unloading mechanism being connected to the pyrolysis reactor that decomposes the wastes essentially into a syngas and solid products of pyrolysis;

the pyrolysis reactor comprises two waste-feeding screws tapered in shapes with a taper angle that decreases the diameters of the waste-feeding screws along the length of the waste-feeding screws, the waste-feeding screws converging toward each other with a convergence angle;

the syngas cleaning module comprises: a dry cleaner that is connected to the pyrolysis reactor for receiving the syngas produced in pyrolysis; a gas cooler for reducing the gas temperature; a wet-cleaning stage connected to the gas cooler and that comprises a first wet syngas cleaner connected to the gas cooler and intended for cleaning the syngas with a flow of water, and a second wet syngas cleaner connected to the first wet syngas cleaner and intended for cleaning syngas with a flow of an alkali solution; and an absorber that is connected to the wet-cleaning stage for receiving the syngas therefrom and for separating at least a reusable gaseous carbon dioxide from the syngas;

the system further comprising: a floatator that is connected to the wet-cleaning stage and produces reusable water; a centrifuge which is connected to the unloading mechanism of the pyrolysis reactor and is intended for purification of the solid products of pyrolysis; and a desorber that is connected to the absorber and has means for separating the $CO_2$-saturated aqueous solution obtained from the absorber into $CO_2$ and processing water.

2. The system of claim 1, wherein the energy generation unit is a gas-turbine co-generator that generates electrical energy.

3. The system of claim 1, wherein the loading mechanism and the unloading mechanism each contains a double-gate structure comprising a first gate that has means for switching between an open position and a closed position and a second gate that has gate control means for switching between the open position and the closed position, said gate control means operating so that the second gate is closed when the first gate is opened and can be opened only when the first gate is closed and vice versa.

4. The system of claim 3, wherein the loading mechanism further comprises a feed screw located under the second gate for feeding the wastes that falls onto the feed screw when the second gate is the open position.

5. The system of claim 3, wherein the energy generation unit is a gas-turbine co-generator that generates electrical and heat energy.

6. The system of claim 3, wherein said gate control means comprise a first pneumatic cylinder connected to the first gate and a second pneumatic cylinder connected to the second gate, the first pneumatic cylinder and the second pneumatic cylinder operating in an alternating order.

7. The system of claim 6, wherein the loading mechanism further comprises a feed screw located under the second gate for feeding the wastes that falls onto the feed screw when the second gate is open to the pyrolysis reactor.

8. The system of claim 6, wherein the energy generation unit is a gas-turbine co-generator that generates electrical and heat energy.

\* \* \* \* \*